United States Patent [19]
Pasch et al.

[11] 3,990,825
[45] Nov. 9, 1976

[54] SPRUE-SCRAP REMOVAL APPARATUS FOR MOLDS
[75] Inventors: Lambert M. Pasch, Aachen-Nutheim; Heinz Wagemann, Aachen; Hubert Breuer, Stolberg-Zweifall, all of Germany
[73] Assignee: Uniroyal, A.G., Aachen, Germany
[22] Filed: Feb. 28, 1975
[21] Appl. No.: 554,278

[30] Foreign Application Priority Data
Apr. 29, 1974 Germany............................ 2420722

[52] U.S. Cl................................. 425/231; 225/93; 264/161; 425/310
[51] Int. Cl.².......................................... B29C 17/12
[58] Field of Search .......... 425/225, 229, 231, 216, 425/215, 217, 218, 289, 310, DIG. 51, 374; 225/93; 264/161

[56] References Cited
UNITED STATES PATENTS
3,588,958  6/1971  Metzger...................... 425/DIG. 51

FOREIGN PATENTS OR APPLICATIONS
994,417  8/1951  France.......................... 425/DIG. 51

*Primary Examiner*—Francis S. Husar
*Assistant Examiner*—R. J. Charvat
*Attorney, Agent, or Firm*—Philip Sands

[57] ABSTRACT

Apparatus for removing partially exposed, upstanding, plug-like, cured scrap from sprues of a mold is disclosed. The scrap is integral with and separable from cured elastomeric product formed in respective mold cavities of the mold at corresponding sprue constriction regions of minimum cross-section. The apparatus comprises a wiping assembly engageable with the exposed portions of the scrap, and a system for moving the mold and wiping assembly relative to one another to effect engagement of the scrap with the wiping assembly and thereby tear the scrap free from each cured elastomeric product at the sprue constriction regions of minimum cross-section.

14 Claims, 5 Drawing Figures 3,990,825

SPRUE-SCRAP REMOVAL APPARATUS FOR MOLDS

The foregoing abstract is neither intended to define the invention disclosed in the specification, nor is it intended to limit the scope of the invention in any way.

BACKGROUND OF THE INVENTION

The present invention relates generally to the field of molding elastomeric stock into the form of various mold cavities by transferring elastomeric stock from a transfer or injection unit into the mold cavities, and more particularly to apparatus for removing cured scrap from the sprues of the mold after each cavity-filling-and-compound-curing cycle.

In the field of injection or transfer molding, an injection unit or press is utilized for causing elastomeric stock to flow through various sprues or apertures formed in the mold and into corresponding mold cavities. During a subsequent period in which the stock cures in the mold cavities, the stock likewise cures in the mold sprues in the form of upstanding, plug-like elements extending outwardly of the sprues.

These plug-like elements of cured scrap must be removed from the sprues before the mold can be again cycled. Removal of the cured scrap from the sprues is often a time consuming chore which is conventionally done manually by the use of various brushes or blowers and the like, or simply by hand. Thus, there is a margin of human error associated with this procedure. The failure to effectively remove all of the cured scrap from the sprues may leave the latter at least partially blocked, thereby preventing elastomeric stock from penetrating the sprues and filling the mold cavities on a subsequent injection or transfer cycle. Moreover, the injection or transfer pressure may force the cured elements of sprue scrap through the sprues and into the mold cavities, thereby mixing the sprue scrap with elastomeric stock that is yet to be cured in the mold cavities. Upon curing of this already partially cured mixture, there results the formation of elastomeric products in the mold cavities which are non-homogeneous and, thus, faulty.

SUMMARY OF THE INVENTION

Accordingly, it is an object of the present invention to provide apparatus which is effective and efficient for removing the plug-like, cured scrap from the sprues of a mold, to thereby obviate the above discussed and other disadvantages associated with the conventional manual operation of sprue-scrap removal.

To the latter end, the present invention relates to apparatus which comprises wiping means engageable with the exposed portions of cured elastomeric stock confined in the sprues of a mold, and shifting means for moving the mold and wiping means relative to one another and effect engagement of the scrap with the wiping means to thereby tear the scrap free from the cured elastomeric products formed in the mold cavities at each sprue-constriction region of minimum cross-section between the outer region of each mold cavity and the inner region of each sprue.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of the preferred embodiment in which.

DETAILED DESCRIPTION OF THE INVENTION

Figure 2:
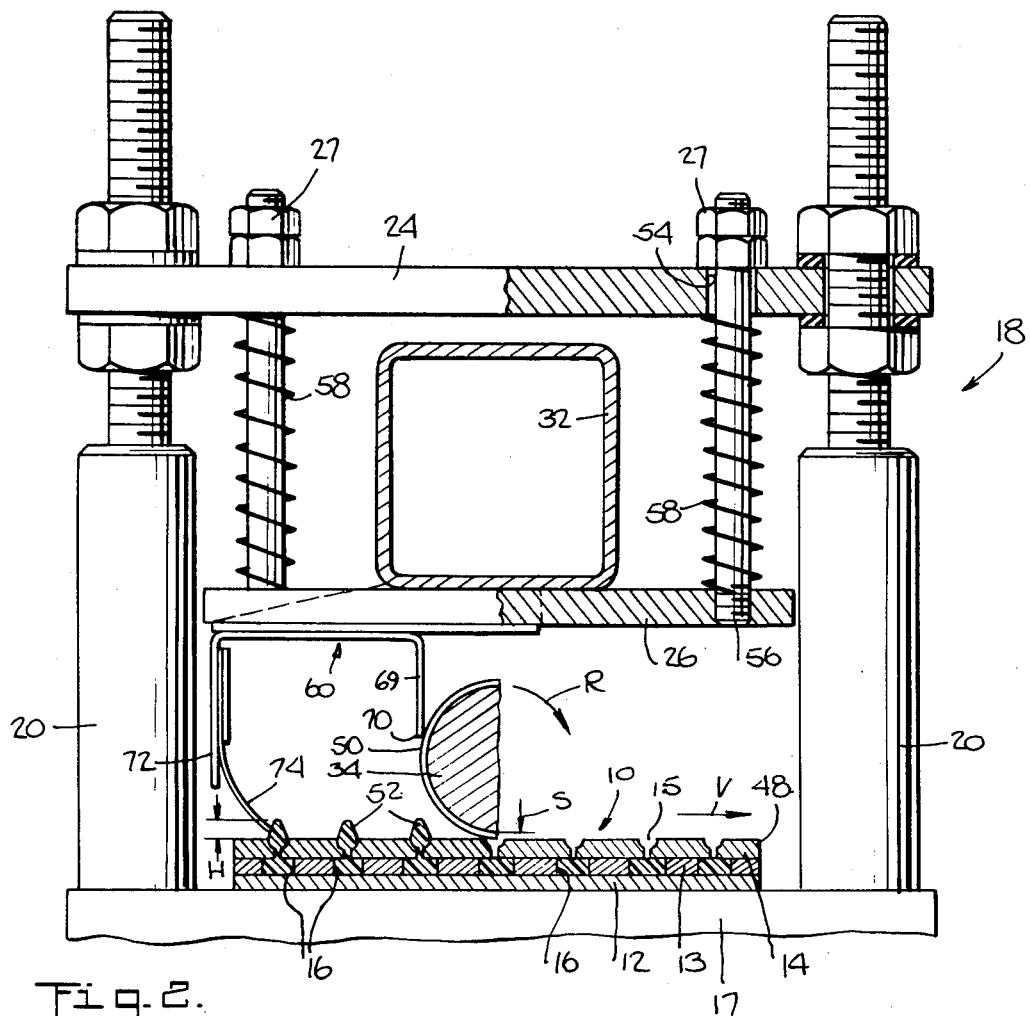
FIG. 2 is a fragmentary, partially cross-sectional view taken partially along the line 2—2 in FIG. 1.

Referring now to the drawings and more particularly to FIG. 2, there is illustrated a mold unit denoted generally by the reference character 10. The mold unit 10 includes a base plate 12, an intermediary plate 13 and a top cover plate 14. The top cover plate 14 is provided with a plurality of tapered sprues or apertures 15 which communicate with respective ones of a plurality of mold cavities 16 formed in the intermediary plate 13. The plates 12–14 are retained in superposition relative to one another by conventional means not shown. The mold unit 10 preferably rests upon tracks 17' of a base or bed 17 for sliding movement in the direction of arrow V.

The bed 17 is part of an assembly or apparatus denoted generally by the reference character 18. The bed 17, and in particular the tracks 17' thereof upon which is slidable the mold unit 10, is an extension of an injection unit (or transfer unit) and mold-support assembly (not shown). Thus, after a given injection or transfer cycle in which the mold cavities 16 are filled with elastomeric stock and the stock is cured, the mold unit 10 can be shifted from the vicinity of the mold-support assembly of the injection or transfer unit (not shown) to a position overlying the bed 17 as illustrated in FIG. 2. In the latter position, the mold unit 10 is in a condition for being operated upon the apparatus 18 of the present invention.

Figure 1:
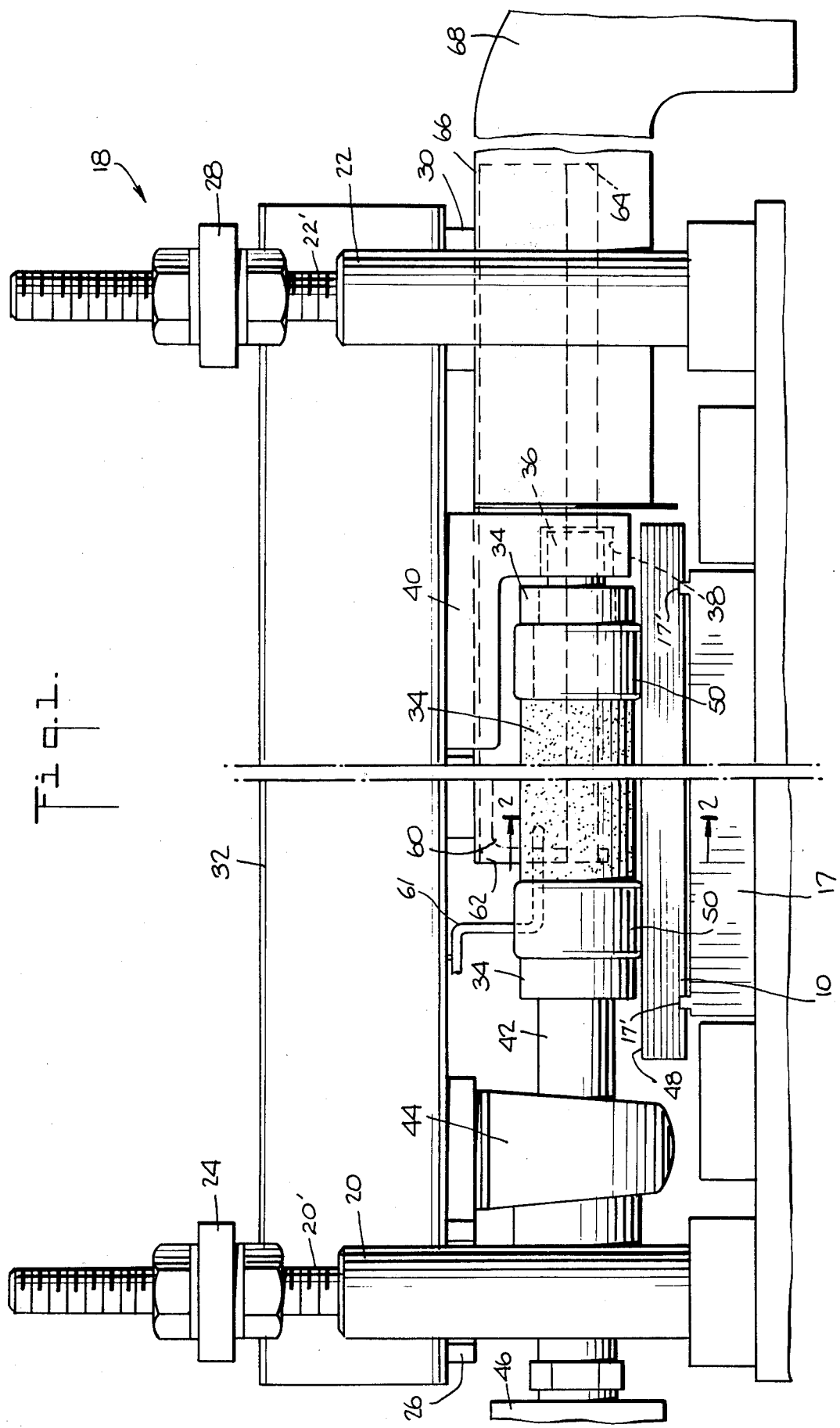
FIG. 1 is a schematic, fragmentary, front elevational view of the apparatus pursuant to the present invention.

Referring now also to FIG. 1, the apparatus 18 includes the tracked bed 17 from which extend upwardly two pairs of columns 20 and 22 whose lengths can be vertically adjusted. For this purpose, for example, the columns 20 and 22 may be in the form of power cylinders or jacks and the like having respective vertically adjustable piston rods 20' and 22'. The columns 20 support an upper plate 24 and a lower plate 26, a pair of rods 27 interconnecting the upper plate 24 and lower plate 26. A similar arrangement of upper and lower plates 28 and 30 is provided for the columns 22. A square-like member 32 bridges the lower plate 26 of the columns 20 with the corresponding lower plate 30 of the columns 22. The bridging member 32 in turn supports the wiping means of the present invention above the mold assembly 10.

In this respect, the wiping means is in the form of a roller 34 having one end 36 (FIG. 1) of reduced diameter freely journaled in a recess 38 of a bracket 40 affixed to and depending from the bridging member 32. The opposite end 42 of the roller 34 is also of reduced diameter and freely journaled in a coupling bracket 44 affixed to and depending from the bridging member 32. Associated with the end 42 of the roller 34 is a driver or motor unit 46 for rotating the roller 34 clockwise (arrow R) of FIG. 2. Manual rotation of the roller 34, by hand, is also contemplated.

The roller 34 overlies the mold unit 10, but is retained at a preferred slight distance S from the upper surface 48 of the top mold plate 14 by means of a pair of spaced bearing members 50. The bearing members 50 are rotatable independently of the roller 34 by means of a ball bearing-and-raceway assembly (not shown) interposed between each bearing member 50 and the roller 34. The bearing members 50 are engageable with the upper surface 48 of the top mold plate 14 when the columns 20 and 22 are downwardly adjusted, and thereby space the roller 34 from the upper surface 48.

The bearing members 50 can thus rotate counterclockwise of FIG. 2 in frictional response to movement of the mold unit 10 in the direction of arrow V. However, the roller 34 can still be rotated clockwise, namely in a direction opposite of the direction of movement of the mold unit 10. Since the roller 34 is spaced from the upper surface 48 by the slight distance S (which distance is less than the exposed height H of cured sprue scrap in the form of upstanding, plug-like elements 52 extending outwardly of the mold sprues 15), the periphery of the roller 34 can engage and tear free the elements 52 from their corresponding molded products formed and cured in respective ones of the mold cavities 16 when the mold unit is shifted in the direction of arrow V. This will be clarified further below.

In order to press the bearing members 50 against the mold unit 10 without damaging either, the rods 27 are telescopically shiftable through corresponding apertures 54 in the upper plates 24 and 28, whereas the lower end 56 of each rod 27 is affixed (by threading or the like) to the lower plates 26 and 30. Respective compression springs 58 surround each rod 27 and resiliently retain each upper plate 24, 26 spaced from its associated lower plate 28, 30. The springs 58 thus govern the pressure exerted by the bearing members 50 against the mold unit 10 upon a reduction in the length of the columns 20 and 22.

Also affixed to the bridging member 32 is a generally U-shaped, channel-like, housing member 60 which has an initial end 62 (FIG. 1) adjacent to the left bearing member 50 and terminates beyond the right bearing member 50, for example at 64. The latter end 64 projects into a conduit 66 affixed to the bridging member 32 and having an elbow portion 68 communicating with a sprue-collecting medium in the form, for example, of a basket or the like.

As best seen in FIG. 2, the U-shaped member 60 has a vertical leg 69 which functions like a wiping blade having an edge 70 in close proximity with, if not in direct contact with, the periphery of the roller 34. The opposite leg 72 is longer than the leg 68 and spaced from the mold unit 10 by an amount greater than the height H of the sprue-scrap elements 52. However, the leg 72 carries a flexible flap member 74 which functions to close the leg 72 upon the mold unit 10 without interfering with movement of the sprue-scrap elements 52 from the leg 68 to the leg 72 upon shifting of the mold unit 10 in the direction of arrow V.

It will be understood, although not shown, that compressed air can be introduced into the enclosure defined by the U-shaped member 60 and the flap member 74 by a hose 61 or other conventional means to effect an air current moving from the initial end 62 of the U-shaped member 60 to the opposite end 64 thereof and into the conduit 66. The purpose of the air current will become apparent below.

In operation, after a given injection (or transferring) and curing cycle, the mold unit 10 is shifted from its position at the injection or transferring press (not shown) along the tracked bed 17. During movement of the mold unit 10 (which can be done manually or otherwise), the motor unit 46 rotates the roller 34 in a direction opposite the direction of movement of the mold unit 10 and an air current is introduced in the U-shaped member 60. The periphery of the roller 34 (which is preferably friction-inducing or textured) engages the sprue-scrap elements 52 thereby causing the latter to tear free from the molded elastomeric products formed and cured in the mold cavities 16. The air current then becomes effective to carry the freed scrap elements 52 from the member 60 and into the conduit 66 for collection downstream of the elbow 68.

Figure 5:
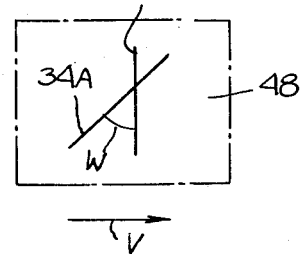
FIG. 5 is a fragmentary, schematic plan view of the mold and the preferred orientation of its sprues with respect to the axis of the wiping means of the present invention.

Since the sprues 15 are arranged in parallel rows and columns in the top plate 14 (a conventional expedient not shown), the sprue-scrap elements 52 may within a single row offer a combined resistance to tearing and pull-out in excess of that which the assembly is designed for optimum operation. As a result, it has been determined, that, in order to minimize such pull-out resistance, the axis 34A of rotation of the roller 34 should extend at an angle with respect to the common axis 15A of the sprues 15 in a given sprue-row or column. This feature is illustrated in FIG. 5 wherein the roller axis 34A forms an exaggerated acute angle W with the common sprue axis 15A. The particular angle W selected should preferably be such that the elements of sprue-scrap 52 within a given sprue row or column (axis 15A) are engaged independently (one at a time) in series or succession by the roller 34. Thus, the only resistance to pull-out at a given instant is that offered by a single element of sprue-scrap 52 and not by a plurality of such elements.

Figure 3:
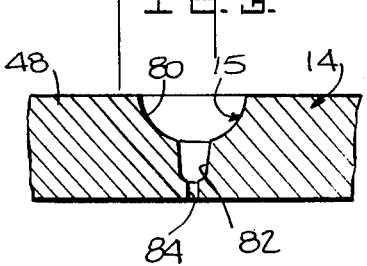
FIG. 3 is an enlarged, fragmentary, cross-sectional view of a preferred form of a sprue pursuant to the present invention.

In order to effect tearing of the elements 52 of sprue-scrap from their respective molded products cured in the mold cavities 16 without leaving burrs or flash on such products, and in order to optimize pull-out and removal of the scrap elements 52, it is preferred that the sprues 15 in cross-section, as illustrated in FIG. 3, be designed with three portions which in succession outwardly increase in open area. Thus, each sprue 15 is provided with an outermost, preferably conical, portion 80, an intermediary portion 82 and an innermost constricted portion 84. The latter constriction portion 84 is preferably narrow and short enough to permit tearing of an element of scrap 52 from its corresponding cured product cleanly, with the substantial absence of flash.

It will be understood that although the outermost portion 80 has been described as being preferably conical, other forms such as those which are cup-shaped, hemispherical, lens-shaped, etc., are also contemplated.

Figure 4:
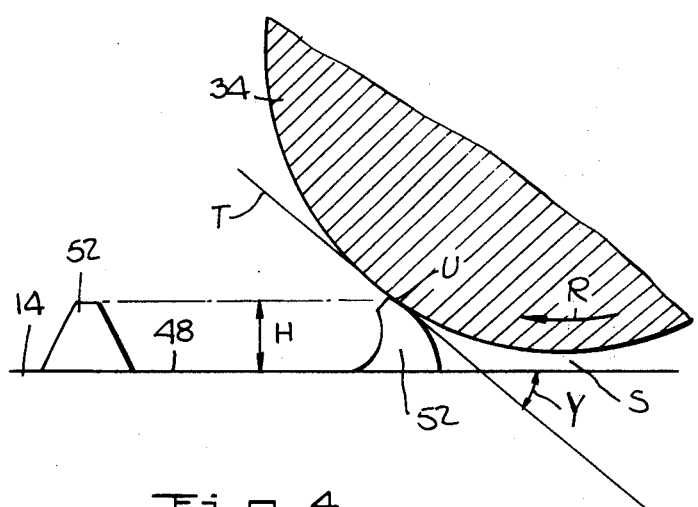
FIG. 4 is schematic view illustrating a mathematical relationship between the wiping means and mold pursuant to the principles of the present invention.

A preferred mathematical relationship of the roller 34 with the scrap elements 52 is illustrated in FIG. 4. In this respect, it is preferred that the roller 34 have a diameter of sufficient size such that a tangent line T, at a point U at which the roller periphery first contacts and deforms a given scrap element 52, forms an angle Y in the range of 45° with the upper or exposed surface 48 of the top cover plate 14 of the mold. Considered in this relationship of course is the spacing S of the roller periphery from the top surface 48 of the cover plate 14. It has been determined that the spacing S should preferably be less than one half the maximum span of the intermediary portion 82 of the sprue 15, and of course less than the height H of the exposed portion of the scrap elements 52, and when the spacing S is, for example, approximately 0.5 millimeters (as is preferable), the diameter of the roller 34 should be approximately 20 millimeters.

Although the apparatus 18 pursuant to the present invention has been characterized such that the mold unit 10 is movable relative to the roller 34, and the axis of rotation of the roller 34 is radially stationary, it is likewise contemplated herein that the mold unit 10 may be stationary and by means (not shown of conventional nature) the roller 34 can be supported in such a manner that it not only rotates but has an axis of rotation which is shiftable radially relative to the mold unit 10.

It will be understood that the foregoing description of the preferred embodiment of the present invention is for purposes of illustration only, and that the various structural and operational features and relationships herein disclosed are susceptible to a number modifications and changes none of which entails any departure from the spirit and scope of the present invention as defined in the hereto appended claims.

What is claimed is:

1. In combination, a mold and apparatus for removing partially exposed, upstanding, plug-like, cured scrap from the sprues of said mold, the scrap being integral with cured elastomeric product formed in respective mold cavities of said mold at respective sprue constriction regions of minimum cross-section, the apparatus comprising wiping means engageable with the exposed portions of said scrap, and means supporting said mold and wiping means for movement relative to one another to permit engagement of said scrap with said wiping means and thereby tear scrap free from each corresponding cured elastomeric product at each of said sprue constriction regions of minimum cross-section, said wiping means comprising a roller having a periphery engageable with said scrap, housing means cooperating with the periphery of said roller to define with the latter an axially directed passageway for guiding the outflow of removed scrap, and fluid-injection means for inducing in said passageway a current sufficient to carry removed scrap in said housing means in a direction from one axial end portion of said roller to an axially opposite scrap-collecting end portion of said roller.

2. Apparatus as claimed in claim 1, wherein said housing means is generally U-shaped and includes one edge extending in a direction axially of said roller and in close proximity to said scrap, and a second edge extending parallel to said first edge but in close proximity to the periphery of said roller.

3. Apparatus as claimed in claim 2, wherein the sprue rows of said mold extend in a direction gererally obliquely of the axis of rotation of said roller.

4. In combination, a mold and apparatus for removing partially exposed, upstanding, plug-like, cured scrap from the sprues of said mold, the scrap being integral with cured elastomeric product formed in respective mold cavities of said mold at respective sprue constriction regions of minimum cross-section, the apparatus comprising wiping means engageable with the exposed portions of said scrap, and means supporting said mold and wiping means for movement relative to one another to permit engagement of said scrap with said wiping means and therby tear said scrap free from each corresponding cured elastomeric product at each of said sprue constriction regions of minimum cross-section, said wiping means comprising a roller having a periphery engageable with said scrap, and spacer means for spacing said roller from an exposed surface of said mold which confronts said roller and above which extend the exposed portions of said scrap, said means supporting said mold and wiping means including a support upon which shiftably rests said mold for planar movement relative to said roller, said spacer means including a bearing assembly rotatably engageable with said exposed surface of said mold, said bearing assembly freely supporting said roller for independent rotation.

5. Apparatus as claimed in claim 4, including drive means for rotating said roller in a direction opposite the direction of rotation of said bearing assembly in response to movement of said mold relative to said bearing assembly.

6. Apparatus as claimed in claim 5, wherein said drive means includes a power driver.

7. Apparatus as claimed in claim 4, wherein said sprues are formed each with three portions which in succession in a direction outwardly of said mold cavities increase in open cross-sectional span.

8. Apparatus as claimed in claim 7, wherein the outermost one of said three portions is substantially conical.

9. Apparatus as claimed in claim 7, wherein said roller is spaced from said mold by a distance of less than one-half of the cross-sectional span of of the intermediary portion of any one of said sprues.

10. Apparatus as claimed in claim 4, wherein said roller is spaced from said exposed surface of said mold by approximately 0.5 mm. and has a diameter of approximately 20 mm.

11. Apparatus as claimed in claim 4, wherein said wiping means is movable relative to said mold.

12. Apparatus as claimed in claim 4, wherein said mold is movable relative to this wiping means.

13. Apparatus as claimed in claim 4, wherein said mold and said wiping means are each movable relative to each other.

14. Apparatus as claimed in claim 4, wherein said roller periphery has a friction-inducing textured surface.

* * * * *